Patented Feb. 22, 1927.

1,618,369

UNITED STATES PATENT OFFICE.

MAX ENGELMANN AND ALAN R. ALBRIGHT, OF WILMINGTON, DELAWARE, ASSIGNORS TO E. I. DU PONT DE NEMOURS & COMPANY, OF WILMINGTON, DELAWARE, A CORPORATION OF DELAWARE.

DISINFECTING COMPOSITION.

No Drawing.     Application filed January 11, 1923. Serial No. 612,008.

This invention relates to compositions suitable for use as seed disinfectants, and especially to compositions of such a character that they may be advantageously incorporated in the dry state with, or applied to, seeds by a dusting process. Our invention comprises disinfecting compositions in which certain metal oxides or salts that are not readily soluble in water, are mixed with comparatively water-insoluble organic mercury compounds, and particularly compounds in which the mercury atoms are attached directly to atoms of carbon.

Organic mercurial compounds containing mercury combined directly with carbon have not heretofore been used directly, in dry form, in the treatment of seeds, for disinfecting purposes, principally on account of the insolubility of such compounds. We have now discovered that if these compounds of mercury are produced in a very finely divided form; and if they are while in this form mixed with, for example, dry, powdered oxides or hydroxides of certain metals such as magnesium, calcium, barium, strontium, or aluminum; and if these mixtures be applied to seeds by any efficient dusting process; then by virtue of the fine state of sub-division of the effective mercurial constituent, combined with the slight solvent effect exerted by the metal oxide or hydroxide in the presence of the moisture of the soil in which said seeds may have been sown, there is produced a disinfectant effect upon such seeds, in that the spores or germs of plant diseases are destroyed. The percentage germination of the seed, and therefore the yield of grain, are greatly increased by this treatment.

In U. S. Patent 1,167,642 are described mixtures of organic mercury compounds and caustic soda which are completely soluble in water; on account of this property, and being very hygroscopic, they cannot be used for the dusting of seeds before sowing, as such mixtures would tend to form a cake and thereby clog the exit tubes of drilling machinery. The products forming the subject matter of our invention, on the other hand, are perfectly dry powders which are only very slightly soluble in water, which well retain their consistency, and which may therefore be mixed with dry grain for the disinfecting purpose already described.

The ability to use the disinfecting agent in the dry condition is especially advantageous in connection with the sowing of grains, such as wheat, on a large scale, for in such cases the use of the disinfecting agent in the form of its aqueous solution is impracticable.

Mercury compounds which we have found to be effective for purposes of this invention include the mercury derivatives of phenols and of aromatic acids in which the mercury atom is attached directly to a ring carbon atom. As examples of such mercury derivatives, the following may be cited:—

1. Ortho-mercuri-para-nitrophenol (inner anhydride) having the formula:

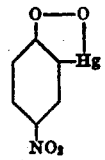

2. Ortho-acetyloxymercuri-phenol:

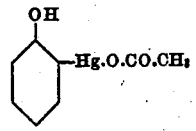

3. 2-mercuri-6-chlorophenol sulphate:

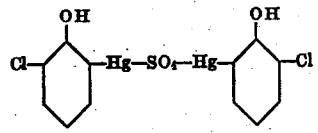

4. Ortho-mercuribenzoic acid (inner anhydride):

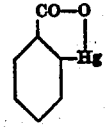

5. 2, 6-mercurichlorobenzoic acid (inner anhydride):

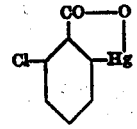

The mercuri-phenols may be obtained by the action of mercury salts on the corresponding phenols: and the mercuri-benzoic acid derivatives may be produced by causing a mercury salt to react with phthalic anhydride or with a salt of phthalic acid, a $CO_2$ group being eliminated.

The substances which are to be used in admixture with organic mercury compounds in accordance with our invention are those metal oxides, hydroxides and salts (such as carbonate) which, when mixed or combined with the mercury compounds above described, form non-hygroscopic products in which, either dry or on treatment with water, the mercury is not split off in any great degree from the basal substance. Such metal derivatives are those, for example, of the alkaline-earth group, and especially hydrated lime or magnesia. These substances may be described generally as solubilizing agents of a low degree of activity, which act also as vehicles for the organic mercury compounds, thereby facilitating distribution of the latter during the dusting treatment.

To render it more available, that is, to increase its disinfecting action to the desired extent, the mercury compound should be present in a very finely divided condition, for example 100 mesh or finer, and preferably of such fineness as to pass through a 200 mesh screen The proportions of the ingredients of our new compositions may vary widely; in general the mercury compound may equal from about 10 to 30% of the mixture, the metal oxide, hydroxide, etc. making up the remainder. The proportion of solubilizing agent of a low degree of activity (e. g. lime or magnesia) should be greater than an equimolecular proportion with respect to the mercury compound present.

Our invention may be illustrated by the following example:

Twenty (20) parts of ortho-mercuri-benzoic acid of such fineness that it can be passed through a 200 mesh screen, is thoroughly mixed with 80 parts of powdered lime. The resulting powder is relatively insoluble in water, is non-hygroscopic, and is capable of forming a closely adherent coating on seeds when mixed with the latter.

Although we prefer to use aromatic mercury compounds, aliphatic mercury compounds may also be used. It is considered essential that the mercury compound be of acid character, that is, capable of yielding, in the presence of alikali-forming metal oxides or hydroxides, compounds which are at least partly soluble in water.

The seed-disinfecting mixtures constituting the subject matter of our invention are generally from whitish to yellowish powders almost insoluble in water, which retain their dry, powdery form on exposure to air containing ordinary amounts of moisture, and which dissolve partly, upon prolonged treatment with water, to form a solution from which the dissolved mercury compound can be precipitated by acidifying with hydrochloric acid.

By the expressions "relatively insoluble", and "almost insoluble", in water, as applied to our new compositions and the constituents thereof, we mean a degree of solubility such as that possessed by a material which will not dissolve completely in 15 times its weight of water at 15° C.

In place of the free mercuri-phenols or free mercuri-carboxylic acids, the calcium, magnesium, or other alkali-earth metal salt of these mercurized phenols and acids may be used

We claim:

1. A composition suitable for disinfecting seeds by a dusting process and comprising a relatively water-insoluble organic mercury compound and a relatively water-insoluble metal-oxygen compound which is capable of acting on said mercury compound as a solubilizing agent of a low degree of activity.

2. A composition suitable for disinfecting seeds by a dusting process and comprising a relatively water-insoluble organic mercury compound in which the mercury atoms are attached directly to atoms of carbon and a relatively water-insoluble metal-oxygen compound which is capable of acting on said mercury compound as a solubilizing agent of a low degree of activity.

3. A composition suitable for disinfecting seeds by a dusting process and comprising a relatively water-insoluble organic mercury compound and relatively water-insoluble alkaline substances of the elements of the alkaline earth metal group, said composition being a non-hygroscopic powder capable of forming a closely adherent coating on seeds when mixed with the latter.

4. A composition as set forth in claim 1 in which the proportion of the mercury compound is from about 10 to 30%.

5. A composition as set forth in claim 3 in which the proportion of the mercury compound is from about 10 to 30%.

6. A composition as set forth in claim 3 in which the alkaline substance is selected from a group consisting of lime and magnesia.

7. A composition suitable for disinfecting seeds by a dusting process and comprising an aromatic mercury compound in which mercury atoms are attached directly to atoms of carbon, mixed with a relatively water-insoluble metal-oxygen compound capable of acting as a solubilizing agent of a low degree of activity.

8. A composition suitable for disinfecting seeds by a dusting process and comprising an aromatic mercury compound mixed with relatively water-insoluble alkaline substances of the elements of the alkaline earth metal group, said composition being nonhygroscopic and capable of forming a closely adherent coating on seeds when mixed with the latter.

9. A composition as set forth in claim 8 in which the alkaline substance is an alkaline earth.

10. A composition as set forth in claim 8 in which the alkaline substance is selected from a group consisting of lime and magnesia.

11. A composition as set forth in claim 7 in which the mercury compound is a mercuri-phenol.

12. A composition as set forth in claim 7 in which the mercury compound is a chloromercuriphenol compound.

13. A composition as set forth in claim 7 in which the mercury compound is a mercuri-benzene derivative in which a ring carbon atom is attached to a substituent comprising the group: —OH.

14. A composition as set forth in claim 7 in which the mercury compound is a chloromercuri-benzene derivative in which a ring carbon atom is attached to a substituent comprising the group: —OH.

15. A disinfecting composition comprising an organic mercury compound mixed with an inorganic metal-oxygen compound to form a mixture having a greater solubility in water than that of the mercury compound alone, said composition being incompletely soluble in fifteen times its weight of water at 15° C.

16. A disinfecting composition comprising an organic mercury compound mixed with alkaline substances of the elements of the alkaline earth metal group, said composition being incompletely soluble in fifteen times its weight of water at 15° C.

17. A disinfecting composition comprising a finely divided mixture of an organic mercury compound in which the mercury is attached directly to carbon, with alkaline substances of the elements of the alkaline earth metal group, said composition being incompletely soluble in fifteen times its weight of water at 15° C.

18. A composition as set forth in claim 17 in which the proportion of the mercury compound is from about 10 to 30%.

19. A composition as set forth in claim 17 in which the proportion of the mercury compound is from about 10 to 30%, and in which the said mercury compound is sufficiently finely divided to pass through a 200 mesh screen.

20. A composition as set forth in claim 17 in which the proportion of the mercury compound is from about 10 to 30%, and in which the alkaline substance comprises an alkaline earth metal hydroxide.

21. Disinfecting compositions comprising mixtures of relatively insoluble alkaline substances of the elements of the alkaline earth metal group with an aromatic mercury compound in which mercury atoms are attached directly to atoms of carbon, said mixtures being from whitish to yellowish powders almost insoluble in water, which retain their dry, powdery form on exposure to air containing ordinary amounts of moisture, and which dissolve partly, upon prolonged treatment with water, to form a solution from which the dissolved mercury compound can be precipitated by acidifying with hydrochloric acid.

22. As an article of commerce, seeds coated with a solid, finely divided mixture of a non-hygroscopic water-soluble organic mercury composition and a solid diluent therefor.

23. As an article of commerce, seeds coated with a non-hygroscopic, water-soluble composition containing a toxic mercury compound and a solid diluent therefor.

24. As an article of commerce, seeds coated with a dry dust or powder consisting of mercuri-chlorophenol, and hydrated lime.

In testimony whereof we affix our signatures.

MAX ENGELMANN.
ALAN R. ALBRIGHT.